(12) United States Patent
Wernersson et al.

(10) Patent No.: US 12,537,612 B2
(45) Date of Patent: Jan. 27, 2026

(54) SELECTION OF TRANSMISSION HYPOTHESIS IN A COMMUNICATION NETWORK

(71) Applicant: Telefonaktiebolaget LM Ericsson (publ), Stockholm (SE)

(72) Inventors: Niklas Wernersson, Kungsängen (SE); Zhao Wang, Täby (SE); Eleftherios Karipidis, Stockholm (SE); Roy Timo, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 651 days.

(21) Appl. No.: 17/777,234

(22) PCT Filed: Nov. 21, 2019

(86) PCT No.: PCT/SE2019/051182
§ 371 (c)(1),
(2) Date: May 16, 2022

(87) PCT Pub. No.: WO2021/101423
PCT Pub. Date: May 27, 2021

(65) Prior Publication Data
US 2023/0031887 A1 Feb. 2, 2023

(51) Int. Cl.
*H04W 4/00* (2018.01)
*H04B 7/024* (2017.01)
(Continued)

(52) U.S. Cl.
CPC ........... *H04B 17/309* (2015.01); *H04B 7/024* (2013.01); *H04L 5/0044* (2013.01); *H04B 7/0626* (2013.01)

(58) Field of Classification Search
None
See application file for complete search history.

(56) References Cited

U.S. PATENT DOCUMENTS 11,223,460 B2 * 1/2022 Wiberg ................ H04B 7/0617
12,021,588 B2 * 6/2024 Mondal ................ H04B 7/0639
(Continued)

OTHER PUBLICATIONS

International Search Report and the Written Opinion of the International Searching Authority, issued in corresponding International Application No. PCT/SE2019/051182, dated Jul. 3, 2020, 24 pages.
(Continued)

*Primary Examiner* — Bob A Phunkulh
(74) *Attorney, Agent, or Firm* — Rothwell, Figg, Ernst & Manbeck, P.C.

(57) ABSTRACT

There is provided mechanisms for selecting a transmission hypothesis. A method is performed by a terminal device. The method comprises receiving reference signals from at least two transmission and reception points (TRPs). The method comprises selecting, from signal quality measurements on the reference signals, a transmission 5 hypothesis from alternative transmission hypotheses pertaining to which one or more of the TRPs that is to transmit data to the terminal device. Which of the transmission hypotheses to select is affected by an adjustment term. The method comprises reporting an indication of the selected transmission hypothesis to at least one of the at least two TRPs.

17 Claims, 7 Drawing Sheets

(51) Int. Cl.
    *H04B 17/309*     (2015.01)
    *H04L 5/00*     (2006.01)
    *H04B 7/06*     (2006.01)

(56) References Cited

U.S. PATENT DOCUMENTS

| | | | | |
|---|---|---|---|---|
| 12,051,091 | B2* | 7/2024 | Wang | G06Q 30/0277 |
| 2013/0003788 | A1* | 1/2013 | Marinier | H04B 7/0626 375/219 |
| 2013/0301432 | A1* | 11/2013 | Hammarwall | H04L 1/0026 370/252 |
| 2014/0064234 | A1* | 3/2014 | Tong | H04L 1/0026 370/329 |
| 2014/0293914 | A1* | 10/2014 | Maattanen | H04L 5/0051 370/329 |
| 2015/0341921 | A1* | 11/2015 | Chen | H04W 72/21 370/330 |
| 2016/0301505 | A1* | 10/2016 | Furuskog | H04W 72/00 |
| 2017/0264415 | A1* | 9/2017 | Wiberg | H04L 5/0091 |
| 2018/0034695 | A1* | 2/2018 | Balasubramanian | G06N 3/04 |
| 2018/0042028 | A1* | 2/2018 | Nam | H04L 5/0035 |
| 2018/0091992 | A1* | 3/2018 | Frenne | H04B 7/0626 |
| 2019/0028176 | A1* | 1/2019 | Zhang | H04L 5/0023 |
| 2019/0349033 | A1* | 11/2019 | Fakoorian | H04B 7/0626 |
| 2019/0357182 | A1* | 11/2019 | Liu | H04L 5/0037 |
| 2020/0314706 | A1* | 10/2020 | Xing | H04W 36/304 |
| 2021/0359742 | A1* | 11/2021 | Mondal | H04W 72/0453 |
| 2021/0391967 | A1* | 12/2021 | Gao | H04L 5/0035 |

OTHER PUBLICATIONS

Ericsson "Views on CSI framework for multi-TRP" 3GPP TSG RAN WG1 Meeting #97, R1-1907424, Reno, USA, May 13-17, 2019, 2 pages.

Ericsson "CSI feedback for multi-TRP" 3GPP TSG-RAN WG1 #89ah-NR, R1-1711031, Qingdao, China, Jun. 27-30, 2017, 7 pages.

Ericsson "On multi-TRP and multi-panel" 3GPP TSG RAN WG1 Meeting #95, R1-1813271, Spokane, USA, Nov. 12-15, 2018, 5 pages.

\* cited by examiner

SELECTION OF TRANSMISSION HYPOTHESIS IN A COMMUNICATION NETWORK

CROSS REFERENCE TO RELATED APPLICATION(S)

This application is a 35 U.S.C. § 371 National Phase Entry Application from PCT/SE2019/051182, filed Nov. 21, 2019, designating the United States, the disclosure of which is incorporated herein by reference in its entirety.

TECHNICAL FIELD

Embodiments presented herein relate to a method, a terminal device, a computer program, and a computer program product for selecting a transmission hypothesis.

Embodiments presented herein further relate to a method, a network node, a computer program, and a computer program product for enabling selection of a transmission hypothesis.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to deploy more than one transmission and reception point (TRP) to serve one and the same coverage region, or cell.

In general terms, multi-TRP, also known as CoMP (coordinated multi-point), refers to any wireless telecommunication network with transmission, reception, or coordination involving multiple antenna units or antenna panels (each defined by one TRP) in order to improve system performance. In some aspects, multi-TRP refers to simultaneous data transmission on the same (or adjacent/neighboring) time/frequency resources from multiple antenna units or antenna panels corresponding to different sectors in a telecommunication network.

Some examples of schemes where multi-TRP transmission is employed are listed next.

Dynamic Point Blanking refers to multiple TRPs coordinating the transmission so that neighboring TRPs might mute the transmissions on the time/frequency resource elements that are allocated to served terminal devices that experience significant interference.

Dynamic Point Selection refers to data transmission to a served terminal device being switched dynamically (in time and frequency) between different TRPs, so that the TRPs are fully utilized.

Coordinated Beamforming refers to the TRPs coordinating the transmissions in the spatial domain by beamforming the transmission power in such a way that the interference to terminal devices served by neighboring TRPs is suppressed.

Coordinated link adaptation refers to joint optimization of the transmission configurations at multiple TRPs such that the downlink transmission is optimized for multiple served terminal devices.

Joint Transmission refers to the signal to a terminal device being simultaneously transmitted from multiple TRPs on the same time/frequency resource. One aim of joint transmission is to increase the received signal power and/or reduce the received interference, if the cooperating TRPs otherwise would serve some other terminal devices without taking joint transmission into consideration.

The possibilities for resource allocation for the physical downlink shared channel (PDSCH) used for data transmission to the terminal devices using multi-TRP transmission for a terminal device 200 requiring ultra reliable low latency communication (URLLC) as supported by Release 16 of the NR radio access technology are illustrated in FIG. 1. In FIG. 1 it is assumed that there are two TRPs; TRP1 and TRP2. Resource Elements (REs) indicated as belonging to TRP1 and TRP2 are used for PDSCH transmission. At (a)-(c) is shown transmission over one slot whereas at (d) is shown transmission over two slots. In FIG. 1, SDM is short for space division multiplexing, FDM is short for frequency division multiplexing, TDM is short for time division multiplexing, and DMRS is short for demodulation reference signal.

As an illustrative example, consider a scenario case where three TRPs (denoted TRP1, TRP2, and TRP3) form a coordination cluster, and assume that a given terminal device currently is served by one of the TRPs, say, TRP1. In the case of joint transmission there will from TRP1 exist four potential multi-TRP transmissions as illustrated in Table 1, where '1' represents that a given TRP is participating in the transmission to the given terminal device whereas '0' represents that it does not.

TABLE 1

Examples of transmission cases for three TRPs

| Multi-TRP transmission case | TRP1 | TRP2 | TRP3 |
|---|---|---|---|
| #1 | 1 | 0 | 0 |
| #2 | 1 | 1 | 0 |
| #3 | 1 | 0 | 1 |
| #4 | 1 | 1 | 1 |

From a system performance perspective, channel state information (CSI) reporting corresponding to the different multi-TRP transmission cases can be used by the network to determine which transmission case that is most beneficial to use when serving the terminal device, i.e., if the terminal device is only to be served by TRP1 or if the terminal device also should be served by one or more of TRP2 and TRP3.

For enabling CSI reporting, the TRPs transmit channel state information reference signals (CSI-RS). For example, the terminal device might be configured with a set of transmission hypotheses, as in Table 2, where each transmission hypothesis corresponds to a set of CSI-RSs and an Interference Measurement Resource (IMR). In case each TRP represents an antenna panel the need for different IMRs may be less motivated, and thus the IMR column might be omitted.

TABLE 2

Examples of transmission hypotheses for three TRPs

| Multi-TRP transmission hypothesis | TRP1 | TRP2 | TRP3 | IMR |
|---|---|---|---|---|
| #1 | CSI-RS1 | 0 | 0 | #1 |
| #2 | CSI-RS1 | CSI-RS2 | 0 | #2 |
| #3 | CSI-RS1 | 0 | CSI-RS3 | #3 |
| #4 | CSI-RS1 | CSI-RS2 | CSI-RS3 | #4 |

A CSI-RS is transmitted on each transmit antenna (or antenna port) of the TRPs and is used by the terminal device to measure the downlink radio propagation channel between each of the transmit antenna ports at the TRPs and each of its own receive antenna ports. The transmit antenna ports are also referred to as CSI-RS ports. The currently supported number of antenna ports in the New Radio (NR) radio access technology are: {1, 2, 4, 8, 12, 16, 24, 32}. From measuring on received CSI-RS, the terminal device is enabled to estimate the radio propagation channel that the CSI-RS is traversing, including also the antenna gains. The CSI-RS for the above purpose is also referred to as Non-Zero Power (NZP) CSI-RS. CSI-RS can be configured to be transmitted in certain REs in a slot and certain slots.

With reference to Table 2, the terminal device will measure the CSI-RS as received from each of the TRPs, i.e., measure CSI-RS1 as received from TRP1, etc., and then select the transmission hypothesis estimated to yield the highest total throughput for data transmission to the terminal device. The selected transmission hypothesis is then reported to the network, which makes the final decision as with regards to which combination of TRPs that should serve the terminal device.

For more general forms of coordination schemes, such as dynamic point switching, Table 2 could be extended with other transmission hypotheses constituting other serving TRPs than TRP1. According to Release 15 of NR, each terminal device selects and reports a transmission format in a way that maximizes its own interests. For example, the terminal device might select the transmission format corresponding to the largest channel quality indicator (CQI) index that achieves a block error rate (BLER) of 10% or less. The terminal device might report the transmission hypothesis it prefers as well as the CSI for that transmission hypothesis. The CSI might reported as a CSI-RS resource indicator (CRI) to indicate to the network about the selected CSI-RS resource in the resource set). If the terminal device is configured to report a single CSI report, then this report will implicitly indicate the UE's preference for either a single-TRP transmission or a multi-TRP transmission.

One issue with the above CSI reporting is that the terminal device will be biased toward always selecting a multi-TRP transmission, because such transmissions will likely lead to higher throughputs or greater reliability for that terminal device.

Hence, there is still a need for improved CSI reporting.

SUMMARY

An object of embodiments herein is to provide efficient transmission hypothesis selection, in turn enabling efficient CSI reporting, not suffering from the issues noted above, or at least where these issues have been mitigated or reduced.

According to a first aspect there is presented a method for selecting a transmission hypothesis. The method is performed by a terminal device. The method comprises receiving reference signals from at least two transmission and reception points (TRPs). The method comprises selecting, from signal quality measurements on the reference signals, a transmission hypothesis from alternative transmission hypotheses pertaining to which one or more of the TRPs that is to transmit data to the terminal device. Which of the transmission hypotheses to select is affected by an adjustment term. The method comprises reporting an indication of the selected transmission hypothesis to at least one of the at least two TRPs.

According to a second aspect there is presented a terminal device for selecting a transmission hypothesis. The terminal device comprises processing circuitry. The processing circuitry is configured to cause the terminal device to receive reference signals from at least two TRPs. The processing circuitry is configured to cause the terminal device to select, from signal quality measurements on the reference signals, a transmission hypothesis from alternative transmission hypotheses pertaining to which one or more of the TRPs that is to transmit data to the terminal device. Which of the transmission hypotheses to select is affected by an adjustment term. The processing circuitry is configured to cause the terminal device to report an indication of the selected transmission hypothesis to at least one of the at least two TRPs.

According to a third aspect there is presented a terminal device for selecting a transmission hypothesis. The terminal device comprises a receive module configured to receive reference signals from at least two TRPs. The terminal device comprises a select module configured to select, from signal quality measurements on the reference signals, a transmission hypothesis from alternative transmission hypotheses pertaining to which one or more of the TRPs that is to transmit data to the terminal device. Which of the transmission hypotheses to select is affected by an adjustment term. The terminal device comprises a report module configured to report an indication of the selected transmission hypothesis to at least one of the at least two TRPs.

According to a fourth aspect there is presented a computer program for selecting a transmission hypothesis. The computer program comprises computer program code which, when run on processing circuitry of a terminal device, causes the terminal device to perform a method according to the first aspect.

According to a fifth aspect there is presented a method for enabling selection of a transmission hypothesis. The method is performed by a network node. The method comprises configuring a terminal device for reporting of a selected transmission hypothesis by signalling, to the terminal device, an adjustment term. The adjustment term affects which transmission hypothesis is selected by the terminal device.

According to a sixth aspect there is presented a network node for enabling selection of a transmission hypothesis. The network node comprises processing circuitry. The processing circuitry is configured to cause the network node to configure a terminal device for reporting of a selected transmission hypothesis by signalling, to the terminal device, an adjustment term. The adjustment term affects which transmission hypothesis is selected by the terminal device.

According to a seventh aspect there is presented a network node for enabling selection of a transmission hypothesis. The network node comprises a configure module configured to configure a terminal device for reporting of a selected transmission hypothesis by signalling, to the terminal device, an adjustment term. The adjustment term affects which transmission hypothesis is selected by the terminal device.

According to an eight aspect there is presented a computer program for enabling selection of a transmission hypothesis, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously, these methods, these terminal devices, these network nodes, these computer programs, and this computer program product provide, or at least enable, efficient transmission hypothesis selection.

Advantageously, the disclosed transmission hypothesis selection in turn enables efficient CSI reporting that does not suffer from the issues noted above.

Advantageously, when the terminal device is operatively connectable to two or more TRPs, multi-TRP transmission is only triggered when either significant performance boosting is predicted, or a controlled interference level is introduced to other terminal devices.

Advantageously, the disclosed transmission hypothesis selection has low complexity and keeps the same hypotheses testing space at the terminal device side for rank indicator feedback, precoding matrix index feedback, and channel quality indicator feedback.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
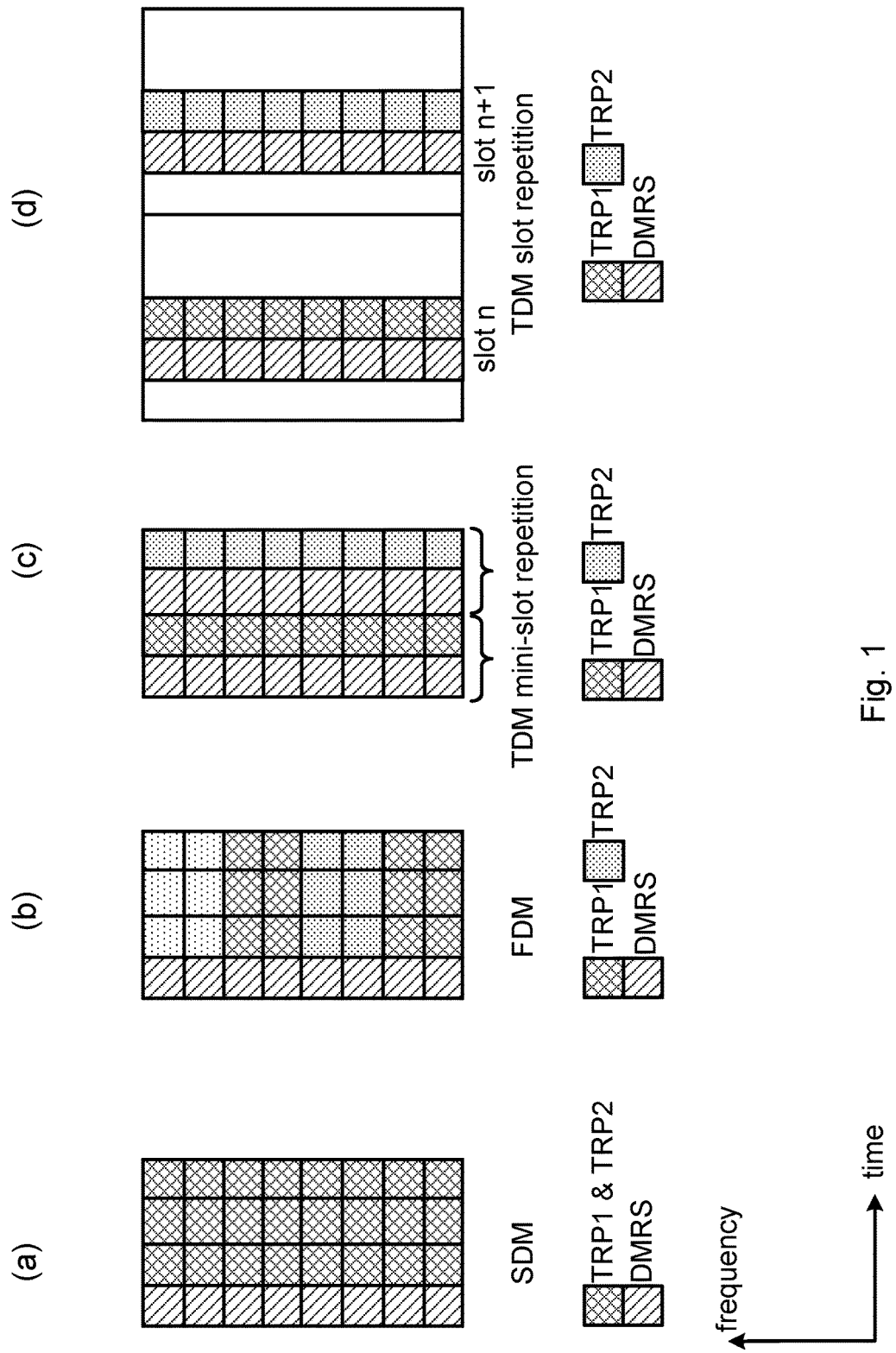
FIG. 1 is a schematic illustration of allocation of signals in a time/frequency grid according to embodiments.
Figure 2:
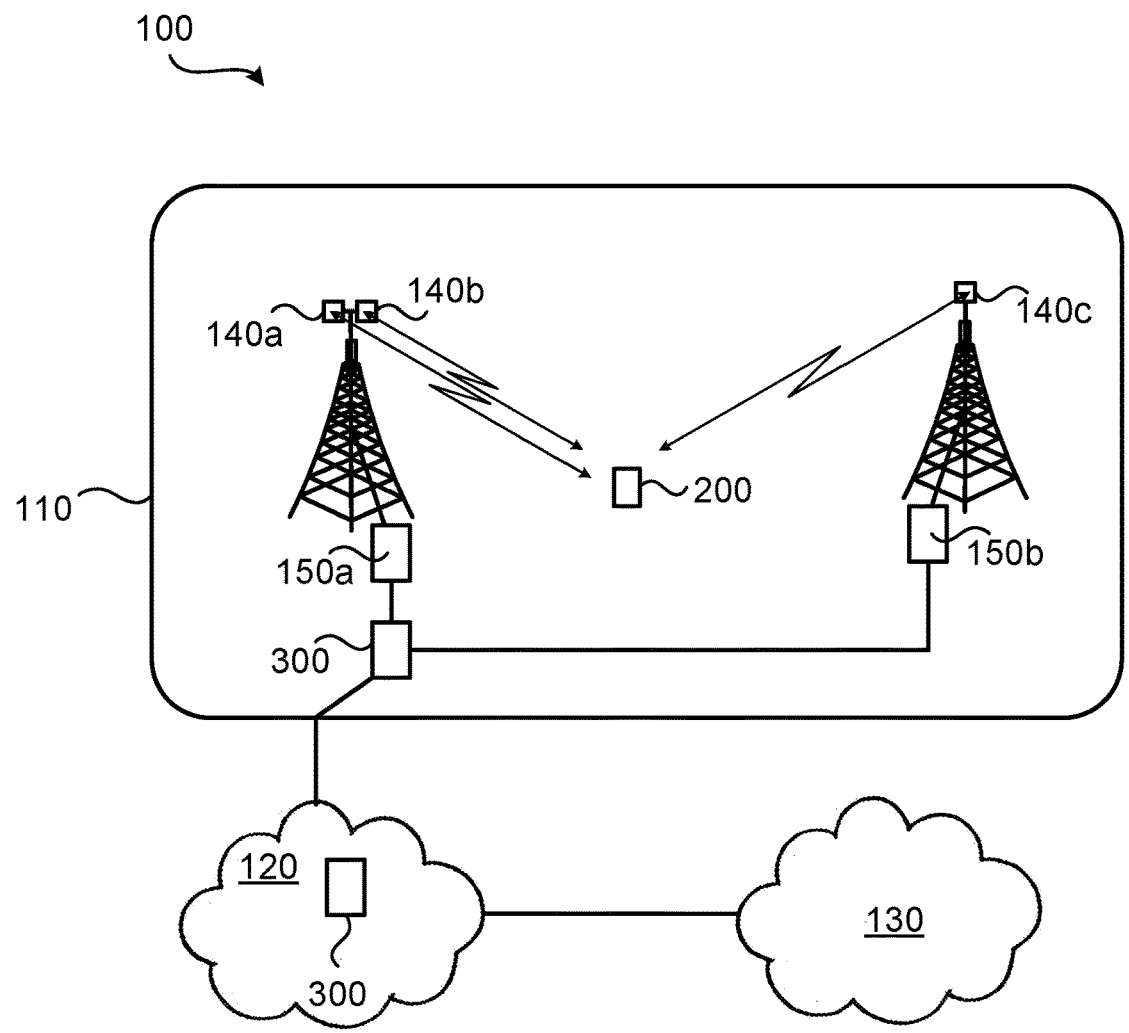
FIG. 2 is a schematic diagram illustrating a communication network according to embodiments.

FIG. 2 is a schematic diagram illustrating a communication network 100 where embodiments presented herein can be applied. The communication network 100 comprises a radio access network 110, a core network 120, and a packet based service network 130.

In turn, the radio access network 110 comprises TRPs 140a, 140b, 140c. The TRPs are controlled by radio access network nodes 150a, 150b. According to the illustrative example of FIG. 2, TRPs 140a, 140b are controlled by radio access network node 150a, and TRP 140c is controlled by radio access network node 150b.

In turn, the radio access network nodes 150a, 150b are controlled by one or more network nodes 300 provided either in the radio access network 110 or the core network 120. The TRPs 140a-140c collectively provide network access in coverage regions to terminal devices, as represented by terminal device 200. Terminal device 200 is thereby served by one or more of the TRPs 140a-140c and is thus enabled to access services of, and exchange data with, the service network 130.

As the skilled person understands, the communication network generally comprises two or more TRPs 140a-140c controlled by one or more radio access network node 150a, 150b such that the terminal device 200 is enabled to receive signals from at least two TRPs 140a, 140b, 140c.

As disclosed above, CSI reporting can be used by the network to determine which transmission case that is most beneficial to use when serving the terminal device 200, i.e., if the terminal device 200 is best served by one single one of the TRPs 140a-140c or if the terminal device 200 is best served by two or more of the TRPs 140a-140c.

As noted above, for enabling CSI reporting, the TRPs 140a-140c transmit channel state information reference signals (CSI-RS).

As noted above, there is still a need for improved CSI reporting. As also noted above, the terminal device will be biased toward always selecting a multi-TRP transmission, because such transmissions will likely lead to higher throughputs or greater reliability for that terminal device. That is, from the perspective of each individual terminal device 200, triggering a multi-TRP transmission will always bring it individual benefits, because such transmissions have more degrees of freedom in the radio propagation channel. From the perspective of the network, always triggering multi-TRP transmission brings higher total interference level within the cell and across cells which may lead to performance degradation in total. Always triggering multi-TRP transmission requires high complexity for scheduling and radio resource management. Furthermore, multi-TRP transmissions are also costly in the sense that if multiple TRPs are occupied to serve only a few terminal devices, or even one single terminal device, there is a risk that some terminal devices cannot be served. Further, additional gains from multi-TRP transmission may in some cases result in cost-wise unjustifiable additional complexity in the receiver implementation at the terminal devices, e.g. when there is significant discrepancy in the path gains from each TRP. It An alternative could therefore be for the terminal device 200 to report the CSI corresponding to each transmission hypothesis, but this would be costly in terms of overhead.

According to at least some of the herein disclosed embodiments there is provided a CSI reporting mechanism designed such that an adjustment term is applied when the terminal device decides on which one or more a transmission hypothesis to report. In some aspects, the application of the adjustment term results in that transmission hypotheses involving multi-TRP transmission are penalized over transmission hypotheses involving single-TRP transmission, implying that multi-TRP transmission might be triggered only when its beneficial from a system performance perspective. This will hence imply that the CSI reporting of the terminal device is not solely based on the individual perspective of the terminal device.

The embodiments disclosed herein thus relate to mechanisms for selecting a transmission hypothesis and enabling selection of a transmission hypothesis. In order to obtain such mechanisms, there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms, there is further provided a network node 300, a method performed by the network node 300, and a computer program product comprising code, for example in the form of a computer program, that when run on processing circuitry of the network node 300, causes the network node 300 to perform the method.

Figure 3:
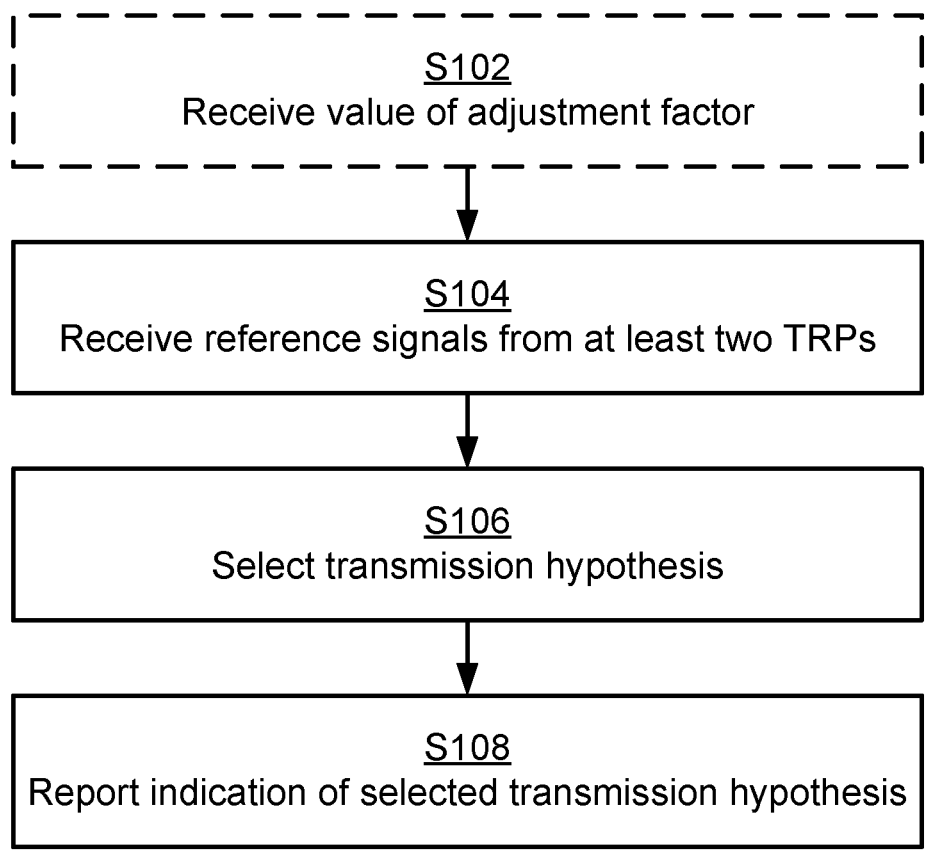
FIGS. 3 and 4 are flowcharts of methods according to embodiments.

Reference is now made to FIG. 3 illustrating a method for selecting a transmission hypothesis as performed by the terminal device 200 according to an embodiment.

S104: The terminal device 200 receives reference signals from at least two transmission and reception points, TRPs 140a, 140b, 140c.

S106: The terminal device 200 selects, from signal quality measurements on the reference signals, a transmission hypothesis from alternative transmission hypotheses. The alternative transmission hypotheses pertain to which one or more of the TRPs 140a, 140b, 140c that is to transmit data to the terminal device 200. Which of the transmission hypotheses to select is affected by an adjustment term.

In some aspects, the terminal device 200 selects the transmission hypothesis estimated to yield the highest total throughput for data transmission to the terminal device 200, but where which of the transmission hypotheses to select is affected by the adjustment term.

S108: The terminal device 200 reports an indication of the selected transmission hypothesis to at least one of the at least two TRPs 140a, 140b, 140c.

In some aspects the network node 300 receives the indication from one or more of the TRPs 140a, 140b, 140c via one or more of the radio access network nodes 150a, 150b. It is then up to the network node 300 to make the final decision as to according to which transmission hypothesis the terminal device 200 is to be served by one or more of the TRPs 140, 140b, 140c. The indication of the selected transmission hypothesis might thus be regarded as recommendation that the network node might decide to either follow or not follow.

Embodiments relating to further details of selecting a transmission hypothesis as performed by the terminal device 200 will now be disclosed.

There could be different types of transmission hypotheses. According to an embodiment, each of the transmission hypotheses corresponds to a unique set of the TRPs 140a, 140b, 140c transmitting data to the terminal device 200. Each unique set of TRPs consists of one or more of the TRPs. For those unique sets of TRPs that consists of at least two TRPs, the TRPs jointly transmit data to the terminal device 200.

In some aspects, a reward function is used as part of selecting the transmission hypothesis. In particular, according to an embodiment, selecting the transmission hypothesis comprises determining, from the signal quality measurements, a reward function for each of the transmission hypotheses. The reward function as determined for at least one of the transmission hypotheses is subjected to the adjustment term. One value of the reward function is thus determined per transmission hypothesis.

There could be different ways to formulate the reward function. In some examples, the reward function is a function of at least one of: rank indicator (RI), precoding matrix index (PMI), and channel quality indicator (CQI). Examples of reward functions will be disclosed below.

As noted above, which of the transmission hypotheses to select is affected by an adjustment term. According to an embodiment, there is one value of the adjustment term for each of the transmission hypotheses. In some aspects, there is one unique value of the adjustment term for each of the transmission hypotheses, or at least there is one unique value of the adjustment term per transmission hypotheses involving the same number of TRPs 140a, 140b, 140c transmitting data to the terminal device 200. That is, all transmission hypotheses involving the same number of TRPs 140a, 140b, 140c transmitting data to the terminal device 200 might have the same value of the adjustment term.

In general terms, the reward function and/or adjustment term is/are defined such that transmission hypotheses involving two or more of the TRPs 140a, 140b, 140c transmitting data to the terminal device 200 are penalized. Particularly, according to the adjustment term, a penalty factor might be added when determining the reward function for any of the transmission hypotheses involving two or more of the TRPs 140a, 140b, 140c transmitting data to the terminal device 200. The adjustment term might thus be considered as a penalty factor.

In further examples the adjustment term is implemented as a function, such as a penalty function.

There could be different factors on which the adjustment term depends. In some examples, the adjustment term is dependent on at least one of: the current load of the TRPs 140a, 140b, 140c, the size of packets for the data to be transmitted to the terminal device 200, the number of packets for the data to be transmitted to the terminal device 200, the current total number of terminal devices 200 served by the TRPs 140a, 140b, 140c, the current time of day when the data is to be transmitted to the terminal device 200, and the current energy price valid for when the data is to be transmitted to the terminal device 200. The value of the adjustment term might thus selectively vary according any of these properties.

For example, the adjustment term might be set such that transmission hypotheses involving multi-TRP transmission are penalized when the current load of the TRPs 140a, 140b, 140c is comparatively high. For example, the adjustment term might be set such that transmission hypotheses involving multi-TRP transmission are penalized when the size of packets for the data to be transmitted to the terminal device 200 is comparatively small. For example, the adjustment term might be set such that transmission hypotheses involving multi-TRP transmission are penalized when the number of packets for the data to be transmitted to the terminal device 200 is comparatively small. For example, the adjustment term might be set such that transmission hypotheses involving multi-TRP transmission are penalized when the current total number of terminal devices 200 served by the TRPs 140a, 140b, 140c is comparatively large. For example, the adjustment term might be set such that transmission hypotheses involving multi-TRP transmission are penalized when the current time of day when the data is to be transmitted to the terminal device 200 corresponds to busy hours for that coverage region. For example, the adjustment term might be set such that transmission hypotheses involving multi-TRP transmission are penalized when the current energy price valid for when the data is to be transmitted to the terminal device 200 is comparatively high.

In some aspects, the terminal device 200 in S106 select one single transmission hypothesis and in S108 reports an indication of this selected single transmission hypothesis. However, in other aspects the terminal device 200 selects more than one transmission hypothesis. That is, in some embodiments, at least two transmission hypotheses are selected, and an indication of each of the at least two transmission hypotheses is reported. The terminal device 200 might thus be configured to report a subset of all configured transmission hypotheses. The terminal device 200 might, for instance, be instructed and/or configured to report the best transmission hypothesis for single TRP transmission and, in addition, one additional transmission hypothesis for multi-TRP transmission.

According to an embodiment, the transmission hypotheses either includes all unique sets of the TRPs 140a, 140b, 140c transmitting data to the terminal device 200, or includes only less than all unique sets of the TRPs 140a, 140b, 140c transmitting data to the terminal device 200. In this respect, in some aspects, it is assumed that there exist a main serving TRP to the terminal device 200 and thus that only transmission hypotheses including this main serving TRP are considered. However, in other aspects there are not any such assumptions. In some examples, a table containing all possible transmission hypotheses is set as a default table and used during the selection. Any subset of the rows may be activated to form a new table. In other examples, a table only containing such a subset of rows is instead set as the default initial table.

In some aspects, the adjustment term depends also on estimated interference. That is, according to an embodiment, each of the transmission hypotheses is associated with its own level of interference, and the adjustment term for each transmission hypotheses is dependent on the level of interference for that transmission hypothesis. The selected transmission hypothesis might thus also depend on the interference level caused by multi-TRP transmission.

In some aspects, the adjustment term is affected by the network node. According to an embodiment, the terminal device 200 is configured to perform (optional) step S102:

S102: The terminal device 200 receives signalling of the adjustment term from one of the at least two TRPs 140a, 140b, 140c.

When performed, step S102 is performed before step S104.

There might be different types of signalling. According to an embodiment, the signalling of the adjustment term is received in a downlink control information (DCI) element, a medium access control (MAC) control element, or via radio resource control (RRC) signalling.

In some aspects, not only an indication of the selected transmission hypothesis is reported. In particular, according to an embodiment, the indication is reported as part of the terminal device 200 reporting channel state information (CSI), and also the CSI for the selected transmission hypothesis is reported.

As in FIG. 2, in some examples, two or more of the TRPs 140a, 140b is represented by individual antenna panels controlled by one and the same radio access network node 150a. Thus, the transmission hypotheses relate to how many antenna panels are to be used for transmission towards the terminal device 200. In some examples, a multi panel codebook, as for instance available in 3GPP TS38.214 (V15.6.0, section 5.2.2.2.2 "Type I Multi-Panel Codebook"), is then applied.

As in FIG. 2, in some examples, at least two of the TRPs 140a, 140b, 140c are controlled by respectively different radio access network nodes 150a, 150b.

One illustrative example based on at least some of the above disclosed embodiments for selecting a transmission hypothesis as performed by the terminal device 200 will now be disclosed. In this illustrative example it is assumed that the terminal device 200 is configured with four multi-TRP transmissions as illustrated in Table 3. With reference to Table 3, the terminal device 200 will, based on measured CSI-RS (where CSI-RS are transmitted by each of the TRPs), select the transmission hypothesis estimated to yield the highest total throughput for data transmission to the terminal device 200, but where which of the transmission hypotheses to select is affected by the adjustment term. The terminal device 200 is, according to this example, instructed or configured to select and report and indication of only one of the transmission hypotheses and might include CSI, for example in terms of RI, RMI, and/or CQI, relating to the transmission hypothesis in the reporting.

TABLE 3

Examples of transmission hypotheses for three TRPs

| Multi-TRP transmission hypothesis | TRP1 | TRP2 | TRP3 |
|---|---|---|---|
| #1 | 1 | 0 | 0 |
| #2 | 1 | 1 | 0 |
| #3 | 1 | 0 | 1 |
| #4 | 1 | 1 | 1 |

The selection of transmission hypothesis is based on one or more reward functions. The terminal device 200 might therefore be configured to loop though the different transmission hypotheses to evaluate the corresponding rewards. Let $R_t$ be the reward corresponding to transmission hypothesis t, where t then corresponds to the different possible transmission hypotheses #1-#4 in Table 3. The selection procedure might then comprise the following:

Step 1: For each t∈{1, 2, 3, 4}, the terminal device 200 derives $R_t$.

In some examples the terminal device 20 for each transmission hypothesis t evaluates a set of parameters, relating to CSI, and selects a subset of the parameters that will be used to derive $R_t$. As an example, let the selected subset correspond to RI, PMI, and CQI and denote it $P_t$. The reward per transmission hypothesis might then be derived using some reward function $f_t$, which at least depends on $P_t$, so that $R_t = f_t(P_t)$. It might be so that $R_t = f_t (P_t)$ is used to evaluate the set of possible choices of $P_t$ and to select one of them. It might also be so that some other mechanism is used to decide on $P_t$.

Step 2: Given the set of $\{R_1, R_2, R_3, R_4\}$ as derived in step 1, the terminal device 200 selects one of the transmission hypotheses using some selection function.

The terminal device 200 use the set of $\{R_1, R_2, R_3, R_4\}$ to select one of the transmission hypotheses using some selection function. Denote the selection function by g and the selected transmission hypothesis by $t_{selected}$. Then, $t_{selected} = g(R_1, R_2, R_3, R_4)$.

In some examples, the selection function g is constructed such that the selected transmission hypothesis does not necessarily correspond to the highest reward. Hence, even if $R_4 > R_1$ it might be so that $t_{selected} = 1$, i.e. that transmission hypothesis #1 in Table 3 is selected. This implies, in the considered example, that transmission hypothesis #4 is avoided since it will involve multiple TRPs and should hence only be used when there is a clear benefit with it. In another situation it might be so that $R_4 >> R_1$ and evaluation using the selection function might then result in that $t_{selected} = 4$. In some examples, the exact form of the selection function g is limited to a pre-determined set of functions and contains an initial state as default. Further, the selection function g might be controlled by, and signaled to the terminal device 200 from, the network node 300 via a DCI control element, a MAC control element, and/or via RRC signaling.

Let $\alpha_t$ correspond to a real valued adjustment term and let the selection function g depend on at least $\alpha_t$ and $R_t$. In some examples, the selection function g is defined as follows:

$$t_{selected} = \underset{t \in \{1,2,3,4\}}{\arg\max}(\alpha_t R_t) \qquad (1)$$

For the embodiment in which the function g relies on the parameters $\alpha_t$, the parameters $\alpha_t$ might have an initial state that is known both at the network node 300 and the terminal device 200. That is, since α here is indexed with t, there might thus be one value of α per hypothesis t. The value of $\alpha_t$ might be updated via a DCI element, a MAC control element, or via RRC signalling.

One purpose of assigning weights as defined by the adjustment term $\alpha_t$ to the reward corresponding to each transmission hypothesis is to balance the preference on multi-TRP over the single-TRP transmission. In some examples, each $\alpha_t$ has a default value and in other examples, the value of each $\alpha_t$ is controlled by the network node 300 via a DCI control element, a MAC control element, and/or via RRC signaling. In some examples, $\alpha_t$ is an adjustment function. The adjustment function for a given transmission hypothesis might, for instance, depend on the number of TRPs participating in that transmission hypothesis.

In other examples, the effect of the selection function g is instead included in step 1. In one such example, $R_t = \alpha_t f_t(P_t)$ and equation (1) may then be replaced by:

$$t_{selected} = \underset{t \in \{1,2,3,4\}}{\arg\max}(R_t) \qquad (2)$$

In yet other examples, if the path gain or any related metric, e.g. CQI, to one TRP, e.g. TRP2, is significantly lower than that of TRP1, then the corresponding rewards, i.e. $R_2$, $R_4$, are excluded from the selection.

As noted above, in some aspects the adjustment term depends also on estimated interference. The reward functions $R_t = f_t(P_t)$ might then depend also on the estimated interference. In some examples, a further adjustment term or function, denoted $\theta_t$, which depends on at least the measured interference caused by transmission hypothesis t based on the IMR and CSI-RS configuration, is therefore considered during the selection of transmission hypothesis. $\theta_t$ might be limited to a finite set of choices, or be based on implementation of the terminal device 200. In some examples, the selection function g also depend on $\theta_t$. Then, equation (1) may then be replaced by $$t_{selected} = \underset{t \in \{1,2,\}}{\arg\max}(\alpha_t R_t - \beta_t \theta_t) \qquad (3)$$

In equation (3), $\beta_t$ is a real number which adjusts the weight on the adjustment term. The value of $\beta_t$ might have an initial state that is known both at the network node 300 and the terminal device 200. The value of $\beta_t$ might be updated via a DCI element, a MAC control element, or via RRC signalling.

Step 3: The terminal device 200 reports an indication of the selected transmission hypothesis.

Information about the selected transmission hypothesis is thus reported. Information potentially related to the selected transmission hypothesis, such as $P_t$, $\alpha_t$, PMI, CQI, RI, or a subset thereof, might also be reported.

Figure 4:
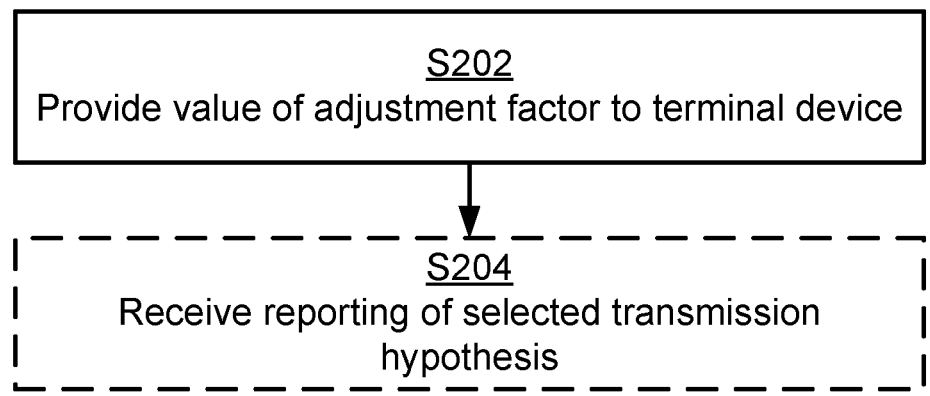

Reference is now made to FIG. 4 illustrating a method for enabling selection of a transmission hypothesis as performed by the network node 300 according to an embodiment.

S202: The network node 300 configures the terminal device 200 for reporting of a selected transmission hypothesis by signalling, to the terminal device 200, an adjustment term. The adjustment term affects which transmission hypothesis is selected by the terminal device 200.

This enables the network node 300 to control the terminal device's 200 tendency to recommend multi-TRP transmissions.

Embodiments relating to further details of enabling selection of a transmission hypothesis as performed by the network node 300 will now be disclosed.

As noted above, there might be different types of signalling. According to an embodiment, the signalling of the adjustment term is provided in a DCI element, a MAC control element, or via RRC signalling.

As disclosed above, the terminal device 200 reports an indication of the selected transmission hypothesis to at least one of the at least two TRPs 140a, 140b, 140c. This reporting might be forwarded to the network node 400. Thus, according to an embodiment, the network node 300 is configured to perform (optional) step S204:

S204: The network node 300 receives reporting of an indication of the selected transmission hypothesis from the terminal device 200.

The network node 300 might receive the reporting via one or more of the radio access network nodes 150a, 150b and one or more of the TRPS 140a, 140b, 140c.

Figure 5:
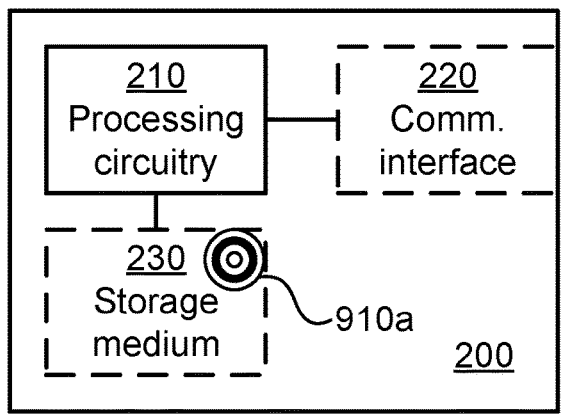
FIG. 5 is a schematic diagram showing functional units of a terminal device according to an embodiment.

FIG. 5 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with other entities, functions, nodes and devices in the communication network 100, such as the network node 300, the TRPS 140a-140c, and the radio access network nodes 150a, 150b. As such the communications interface 220 may comprise one or more transmitters and receivers, comprising analogue and digital components.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 6:
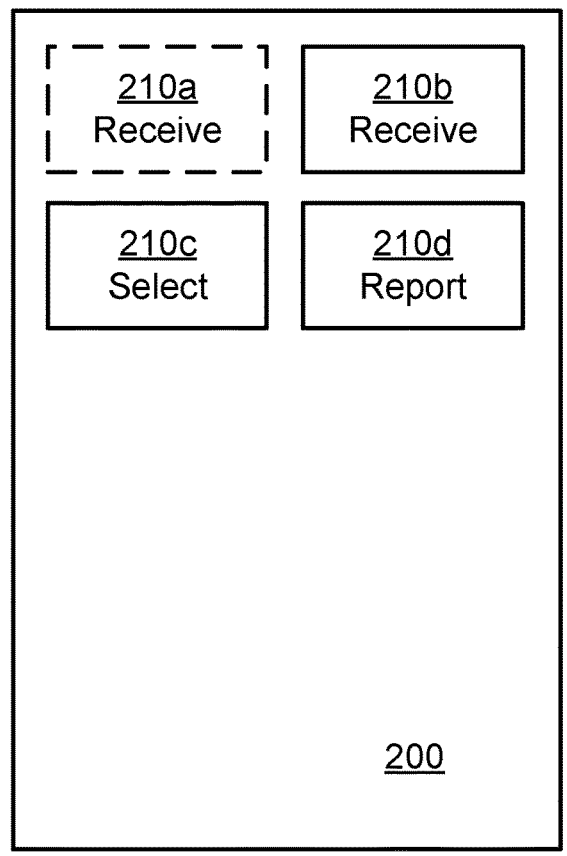
FIG. 6 is a schematic diagram showing functional modules of a terminal device according to an embodiment.

FIG. 6 schematically illustrates, in terms of a number of functional modules, the components of a terminal device 200 according to an embodiment. The terminal device 200 of FIG. 6 comprises a number of functional modules; a receive module 210a configured to perform step S104, a select module 210C configured to perform step S106, and a report module 210d configured to perform step S108. The terminal device 200 of FIG. 6 may further comprise a number of optional functional modules, such as a receive module 210a configured to perform step S102. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the terminal device 200 as disclosed herein.

Figure 7:
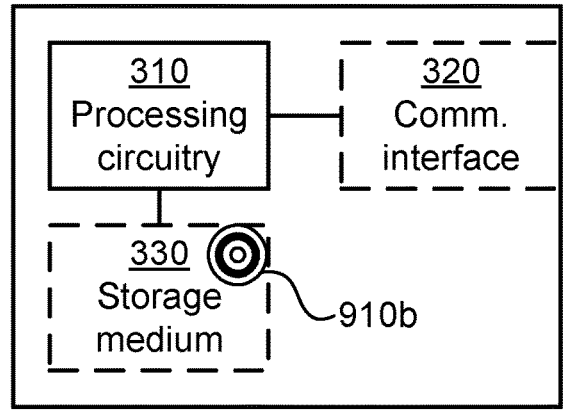
FIG. 7 is a schematic diagram showing functional units of a network node according to an embodiment.

FIG. 7 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus, the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, functions, nodes and devices in the communication network 100, such as the terminal device 200, the TRPS 140a-140c, and the radio access network nodes 150a, 150b. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 8:
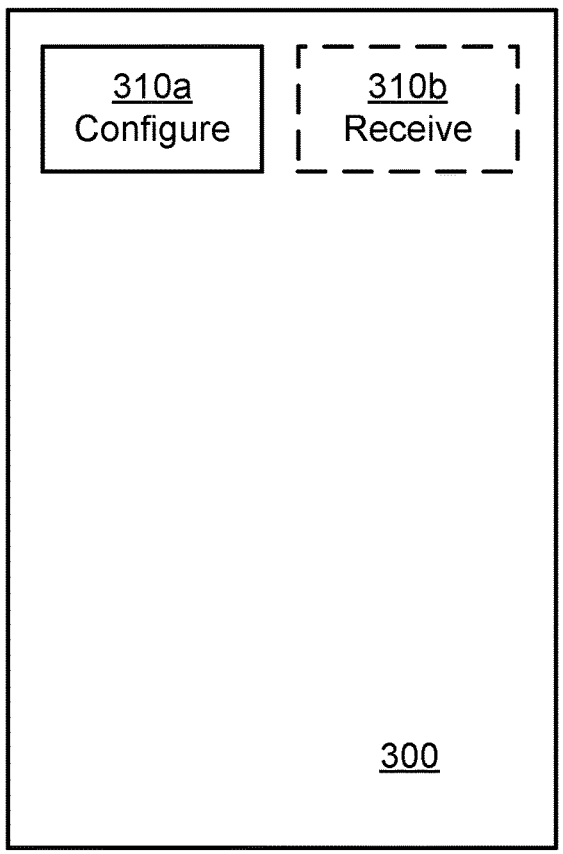
FIG. 8 is a schematic diagram showing functional modules of a network node according to an embodiment.

FIG. 8 schematically illustrates, in terms of a number of functional modules, the components of a network node 300 according to an embodiment. The network node 300 of FIG. 8 comprises a configure module 310a configured to perform step S202. The network node 300 of FIG. 8 may further comprise a number of optional functional modules, such as a receive module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the network node 300 as disclosed herein.

The network node 300 may be provided as a standalone device or as a part of at least one further device. For example, as in FIG. 2, the network node 300 may be provided in a node of the radio access network 110 or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. Thus, a first portion of the instructions performed by the network node 300 may be executed in a first device, and a second portion of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 7 the processing circuitry 310 may be distributed among a plurality of devices, or nodes. The same applies to the functional modules 310a-310b of FIG. 8 and the computer program 920b of FIG. 9.

Figure 9:
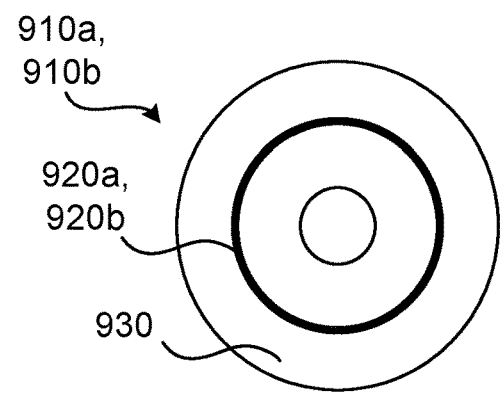
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 23o, to execute methods according to embodiments described herein. The computer program 920a and/or computer program product 910a may thus provide means for performing any steps of the terminal device 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the network node 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

Figure 10:
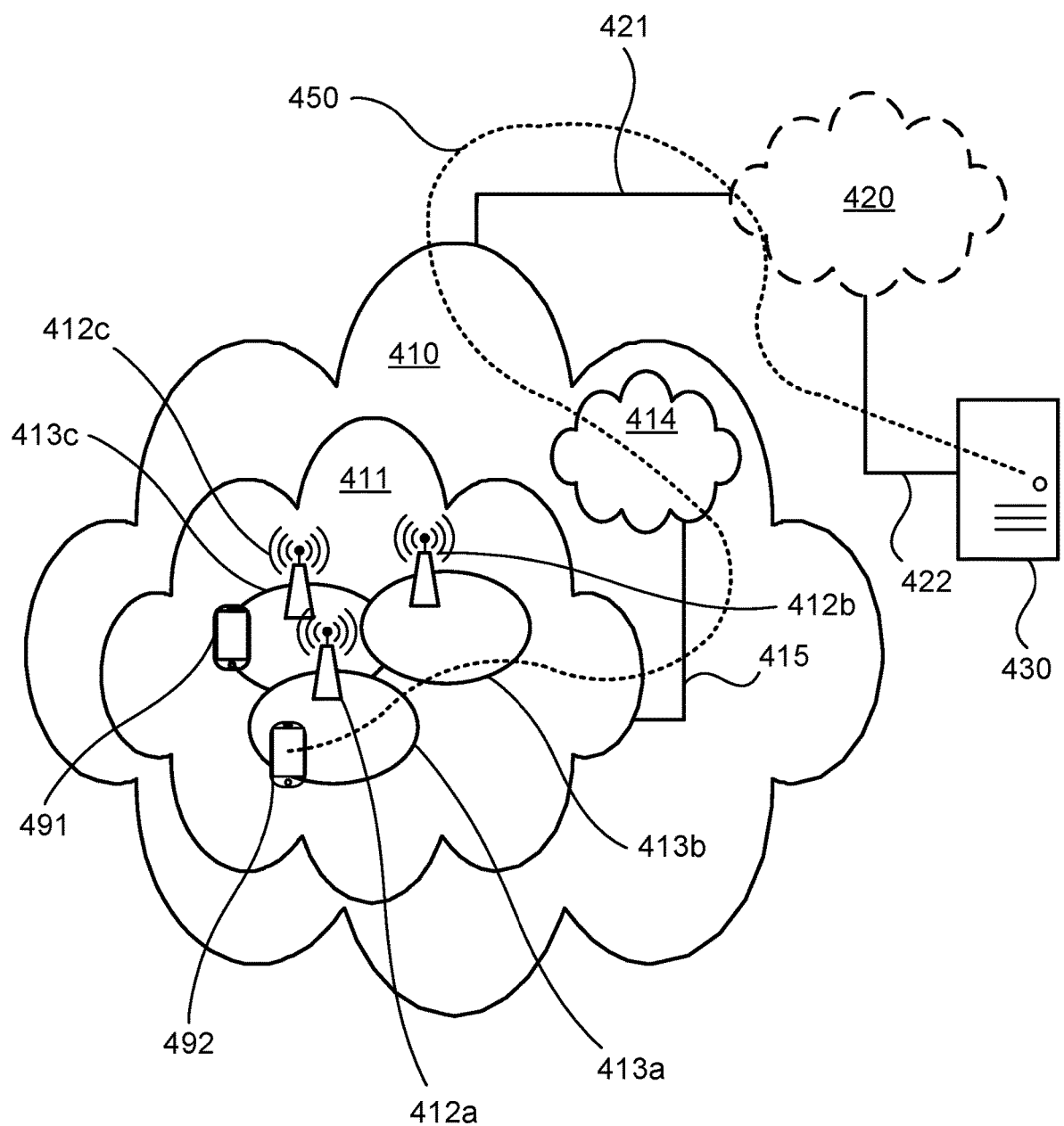
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network no in FIG. 2, and core network 414, such as core network 120 in FIG. 2.

Access network 411 comprises a plurality of radio access network nodes 412a, 412b, 412c, such as NBs, eNBs, gNBs (each corresponding to the network node 300 and/or the radio access network nodes 150a, 150b of FIG. 2) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 200 of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
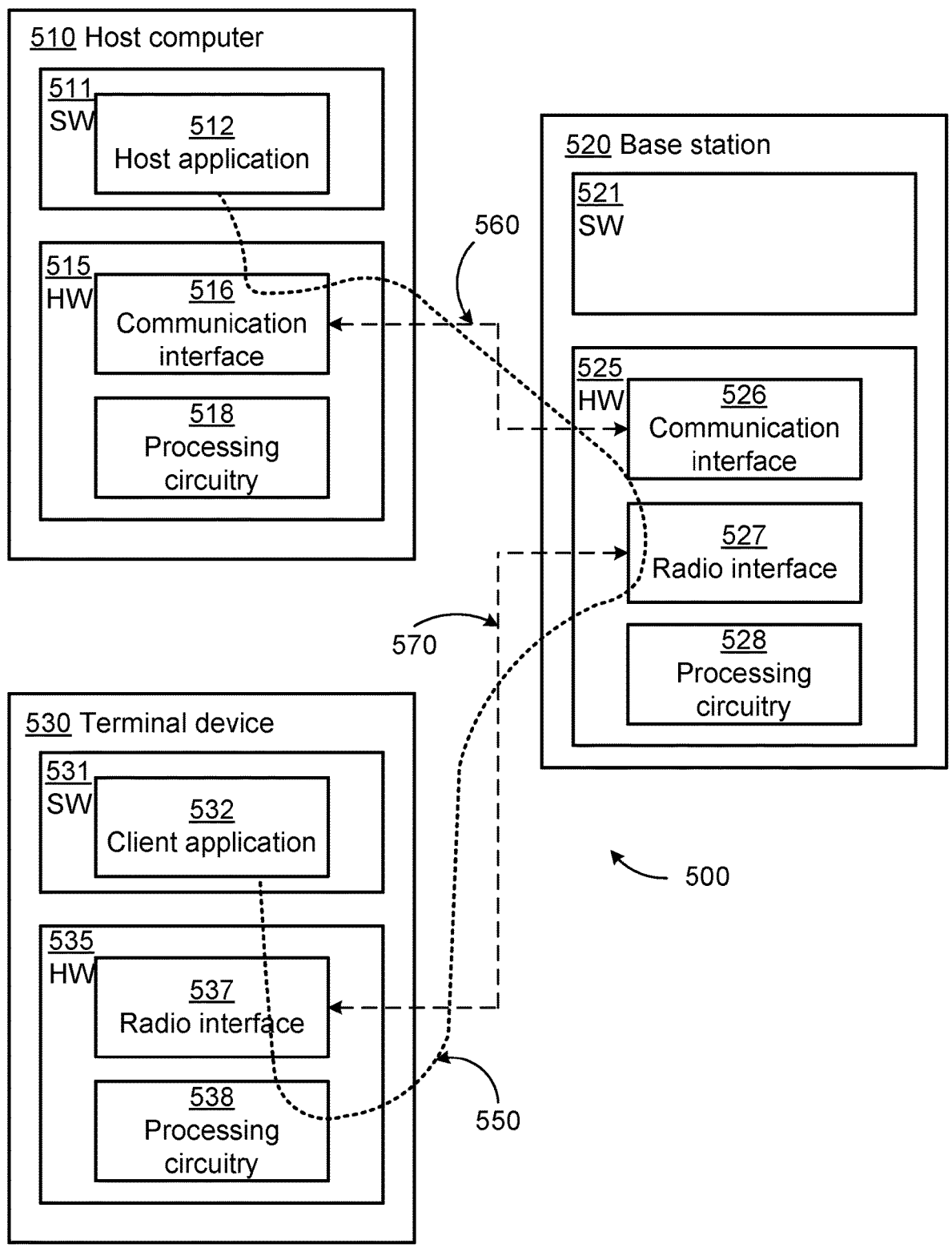
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 200 of FIG. 2. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 300 and/or the radio access network nodes 150a, 150b of FIG. 2. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selecting a transmission hypothesis, the method being performed by a terminal device, the method comprising:
   receiving reference signals from at least two transmission and reception points, TRPs;

selecting, from signal quality measurements on the reference signals, a transmission hypothesis from alternative transmission hypotheses pertaining to which one or more of the TRPs that is to transmit data to the terminal device, wherein which of the transmission hypotheses to select is affected by an adjustment term, wherein selecting the transmission hypothesis comprises determining, from the signal quality measurements, a reward function for each of the transmission hypotheses, and wherein, according to the adjustment term, a penalty factor is added when determining the reward function for any of the transmission hypotheses involving two or more of the TRPs transmitting data to the terminal device; and reporting an indication of the selected transmission hypothesis to at least one of the at least two TRPs.

2. The method according to claim 1, wherein each of the transmission hypotheses corresponds to a unique set of the TRPs transmitting data to the terminal device.

3. The method according to claim 1, wherein the reward function as determined for at least one of the transmission hypotheses is subjected to the adjustment term.

4. The method according to claim 3, wherein the reward function is a function of at least one of: rank indicator, precoding matrix index, and channel quality indicator.

5. The method according to claim 3, wherein there is one value of the adjustment term for each of the transmission hypotheses.

6. The method according to claim 3, wherein the transmission hypotheses either includes all unique sets of the TRPs transmitting data to the terminal device, or includes only less than all unique sets of the TRPs transmitting data to the terminal device.

7. The method according to claim 3, wherein each of the transmission hypotheses is associated with its own level of interference, and wherein the adjustment term for each transmission hypotheses is dependent on the level of interference for that transmission hypothesis.

8. The method according to claim 1, further comprising:
receiving signalling of the adjustment term from one of the at least two TRPs.

9. The method according to claim 8, wherein the signalling of the adjustment term is received in a downlink control information, DCI, element, a medium access control, MAC, control element, or via radio resource control, RRC, signalling.

10. The method according to claim 1, wherein the indication is reported as part of the terminal device reporting channel state information, and wherein also the channel state information for the selected transmission hypothesis is reported.

11. A method for enabling selection of a transmission hypothesis, the method being performed by a network node, the method comprising:
configuring a terminal device for reporting of a selected transmission hypothesis by signalling, to the terminal device, an adjustment term, the adjustment term affecting which transmission hypothesis is selected by the terminal device, wherein, according to the adjustment term, a penalty factor is added when determining the reward function for any of the transmission hypotheses involving two or more transmission and reception points transmitting data to the terminal device; and
receiving an indication of a selected transmission hypothesis.

12. A terminal device for selecting a transmission hypothesis, the terminal device comprising processing circuitry, the processing circuitry being configured to cause the terminal device to:
receive reference signals from at least two transmission and reception points, TRPs;
select, from signal quality measurements on the reference signals, a transmission hypothesis from alternative transmission hypotheses pertaining to which one or more of the TRPs that is to transmit data to the terminal device, wherein which of the transmission hypotheses to select is affected by an adjustment term, wherein selecting the transmission hypothesis comprises to determine, from the signal quality measurements, a reward function for each of the transmission hypotheses, wherein, according to the adjustment term, a penalty factor is added when determining the reward function for any of the transmission hypotheses involving two or more of the TRPs transmitting data to the terminal device; and
report an indication of the selected transmission hypothesis to at least one of the at least two TRPs.

13. The terminal device according to claim 12, wherein each of the transmission hypotheses corresponds to a unique set of the TRPs transmitting data to the terminal device.

14. A network node for enabling selection of a transmission hypothesis, the network node comprising processing circuitry, the processing circuitry being configured to cause the network node to:
configure a terminal device for reporting of a selected transmission hypothesis by signalling, to the terminal device, an adjustment term, the adjustment term affecting which transmission hypothesis is selected by the terminal device, wherein, according to the adjustment term, a penalty factor is added when determining the reward function for any of the transmission hypotheses involving two or more transmission and reception points transmitting data to the terminal device; and
receive an indication of a selected transmission hypothesis.

15. The network node according to claim 14, wherein the signalling of the adjustment term is provided in a downlink control information, DCI, element, a medium access control, MAC, control element, or via radio resource control, RRC, signalling.

16. A computer program product comprising a non-transitory computer readable medium storing a computer program for selecting a transmission hypothesis, the computer program comprising computer code which, when run on processing circuitry of a terminal device, causes the terminal device to:
receive reference signals from at least two transmission and reception points, TRPs;
select, from signal quality measurements on the reference signals, a transmission hypothesis from alternative transmission hypotheses pertaining to which one or more of the TRPs that is to transmit data to the terminal device, wherein which of the transmission hypotheses to select is affected by an adjustment term, wherein selecting the transmission hypothesis comprises to determine, from the signal quality measurements, a reward function for each of the transmission hypotheses, wherein, according to the adjustment term, a penalty factor is added when determining the reward function for any of the transmission hypotheses involving two or more of the TRPs transmitting data to the terminal device; and report an indication of the selected transmission hypothesis to at least one of the at least two TRPs.

17. A computer program product comprising a non-transitory computer readable medium storing a computer program for enabling selection of a transmission hypothesis, the computer program comprising computer code which, when run on processing circuitry of a network node, causes the network node to:

configure a terminal device for reporting of a selected transmission hypothesis by signalling, to the terminal device, an adjustment term, the adjustment term affecting which transmission hypothesis is selected by the terminal device, wherein, according to the adjustment term, a penalty factor is added when determining the reward function for any of the transmission hypotheses involving two or more of transmission and reception points transmitting data to the terminal device; and receive an indication of a selected transmission hypothesis.

* * * * *